(12) United States Patent
Bingham

(10) Patent No.: US 12,491,456 B2
(45) Date of Patent: Dec. 9, 2025

(54) FLUID AND SOLID MATERIAL SEPARATOR

(71) Applicant: Schlumberger Technology Corporaton, Sugar Land, TX (US)

(72) Inventor: Richard Bingham, Katy, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 18/828,026

(22) Filed: Sep. 9, 2024

(65) Prior Publication Data

US 2025/0001334 A1    Jan. 2, 2025

Related U.S. Application Data

(62) Division of application No. 18/341,326, filed on Jun. 26, 2023, now Pat. No. 12,083,457, which is a division of application No. 16/479,818, filed as application No. PCT/US2018/014760 on Jan. 23, 2018, now Pat. No. 11,724,217.

(60) Provisional application No. 62/449,385, filed on Jan. 23, 2017.

(51) Int. Cl.
*B01D 33/048* (2006.01)
*B01D 33/056* (2006.01)
*E21B 21/06* (2006.01)

(52) U.S. Cl.
CPC ......... *B01D 33/048* (2013.01); *B01D 33/056* (2013.01); *B01D 2201/204* (2013.01); *E21B 21/065* (2013.01)

(58) Field of Classification Search
None
See application file for complete search history.

(56) References Cited

U.S. PATENT DOCUMENTS

| | | | |
|---|---|---|---|
| 1,641,736 A | | 9/1927 | Christensen |
| 3,358,834 A | * | 12/1967 | El-Hindi ............... B01D 29/68 |
| | | | 210/387 |
| 3,669,272 A | | 6/1972 | Bilabel |
| 3,800,952 A | | 4/1974 | Bastgen |

(Continued)

FOREIGN PATENT DOCUMENTS

| | | |
|---|---|---|
| CN | 2522385 Y | 11/2002 |
| EP | 2767350 A1 | 8/2014 |

(Continued)

OTHER PUBLICATIONS

International Search Report and Written Opinion for PCT Application PCT/US2018/014760 on Apr. 26, 2018, 8 Pages.

(Continued)

*Primary Examiner* — Joseph C Rodriguez
(74) *Attorney, Agent, or Firm* — Jeffrey D. Frantz

(57) ABSTRACT

An apparatus includes a materials separator that includes a continuous filter belt disposed around a plurality of rollers. The apparatus also includes a pressure differential system operatively coupled to the separator and configured to adjust a pressure differential across the continuous filter belt. A vacuum is applied to the continuous filter belt and a fluid portion of the slurry on the continuous filter belt is drawn through the continuous filter belt. An apparatus includes a materials separator having a first deck with a first continuous filter belt and a second deck with a second continuous filter belt.

16 Claims, 14 Drawing Sheets

(56) References Cited

U.S. PATENT DOCUMENTS

| | | | |
|---|---|---|---|
| 3,876,547 A * | 4/1975 | Kaess | B01D 29/09 |
| | | | 210/387 |
| 3,963,623 A | 6/1976 | Buss et al. | |
| 4,017,398 A * | 4/1977 | Hartmann | B01D 33/466 |
| | | | 100/151 |
| 4,038,193 A | 7/1977 | Oosten | |
| 4,127,487 A * | 11/1978 | Havalda | B01D 29/843 |
| | | | 210/402 |
| 4,168,236 A * | 9/1979 | Bahr | B01D 33/03 |
| | | | 100/118 |
| 4,266,474 A * | 5/1981 | Bahr | B01D 33/056 |
| | | | 100/153 |
| 4,599,117 A | 7/1986 | Luxemburg | |
| 4,657,682 A * | 4/1987 | Uyama | B01D 33/00 |
| | | | 34/329 |
| 4,681,679 A * | 7/1987 | Reber | B01D 33/06 |
| | | | 210/387 |
| 4,812,234 A * | 3/1989 | Perchthaler | C02F 11/123 |
| | | | 210/195.3 |
| 4,908,136 A | 3/1990 | Cho et al. | |
| 4,979,315 A | 12/1990 | Pierson | |
| 5,118,420 A | 6/1992 | Galletti | |
| 5,221,467 A | 6/1993 | Suzuki et al. | |
| 5,443,725 A | 8/1995 | Thissen | |
| 5,954,960 A | 9/1999 | Nagaoka et al. | |
| 6,241,879 B1 | 6/2001 | Kato et al. | |
| 8,092,691 B2 * | 1/2012 | Youngs | B01D 33/42 |
| | | | 435/243 |
| 8,153,003 B2 * | 4/2012 | van Rooyen | B01D 33/04 |
| | | | 210/406 |
| 8,394,270 B2 | 3/2013 | Vasshus et al. | |
| 9,114,340 B2 | 8/2015 | Smith | |
| 9,463,400 B2 * | 10/2016 | Awadalla | B03C 1/286 |
| 11,724,217 B2 * | 8/2023 | Bingham | B01D 33/048 |
| | | | 209/307 |
| 12,083,457 B2 | 9/2024 | Bingham | |
| 12,157,688 B2 * | 12/2024 | Melhus | C02F 11/16 |
| 2010/0224574 A1 * | 9/2010 | Youngs | B01D 33/646 |
| | | | 210/780 |
| 2011/0089122 A1 * | 4/2011 | Smith | B01D 33/056 |
| | | | 210/774 |

FOREIGN PATENT DOCUMENTS

| | | |
|---|---|---|
| GB | 190408605 A | 4/1905 |
| RU | 1389816 A1 | 4/1998 |
| RU | 2353418 C2 | 4/2009 |
| SU | 1037828 A | 8/1983 |
| SU | 1045900 A | 10/1983 |
| UA | 7305 U | 6/2005 |
| UA | 17719 U | 10/2006 |
| WO | 2012145712 A2 | 10/2012 |

OTHER PUBLICATIONS

Intenational Preliminary Report on Patentability for PCT Application PCT/US2018/014760 on Aug. 1, 2019, 6 Pages.

Office Action for Russian Patent Application No. 2019126447/03 dated on Mar. 19, 2020, 15 Pages.

Decision on Grant for Russian Patent Application No. 2019126447/03 dated on May 26, 2020, 13 pages.

Office Action for Mexican Patent Application No. MX/a/2024/007433 dated on Oct. 17, 2024, 6 pages.

* cited by examiner

FLUID AND SOLID MATERIAL SEPARATOR

CROSS-REFERENCE TO RELATED APPLICATIONS

This application is a divisional application of U.S. patent application Ser. No. 18/341,326, filed Jun. 26, 2023, which is a divisional application of U.S. patent application Ser. No. 16/479,818, filed Jul. 22, 2019, which is a National Stage Entry of International Application No. PCT/US2018/014760, filed Jan. 23, 2018, which claims the benefit of and priority to U.S. Provisional Application No. 62/449,385, filed Jan. 23, 2017. Each of the above applications is incorporated herein by reference in its entirety.

BACKGROUND OF THE DISCLOSURE

Oilfield drilling fluid, often called "mud," acts as a lubricant for a drilling bit and increases rate of penetration of the drilling bit. The drilling fluid is pumped through a bore of a drill string to the drill bit, where the drilling fluid exits through various nozzles and ports, lubricating the drill bit. After exiting through the nozzles, the drilling fluid returns to the surface through an annulus formed between the drill string and the wellbore. The drilling fluid also carries cuttings to the surface, where the cuttings are removed and the drilling fluid is otherwise processed for continued use.

Materials separators are used to separate solid particulates of different sizes and/or to separate solid particulate from fluids. Various industries use separators for filtering materials, for example, the oil and gas industry, the food processing industry, the pharmaceutical industry, and the agriculture industry. A materials separator includes a vibrating sieve-like table upon which solids-laden fluid is deposited and through which clean fluid emerges. The vibratory separator may include a table with a perforated plate, filter or screen. A solid-laden fluid is deposited at the feed end of the vibratory separator. As the fluid travels down the length of the vibrating table, the fluid falls through the perforations to a reservoir below, leaving the solid particulate material behind. The vibrating action of the vibratory separator table conveys solid particles left behind to a discharge end of the separator table.

Instead of plates or screens, a materials separator may include a filter belt which continuously rotates as solids-laden fluid is deposited on the belt. These systems may improve working environments by reducing vibrations, noise, and emissions often associated with vibratory table/deck separators.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
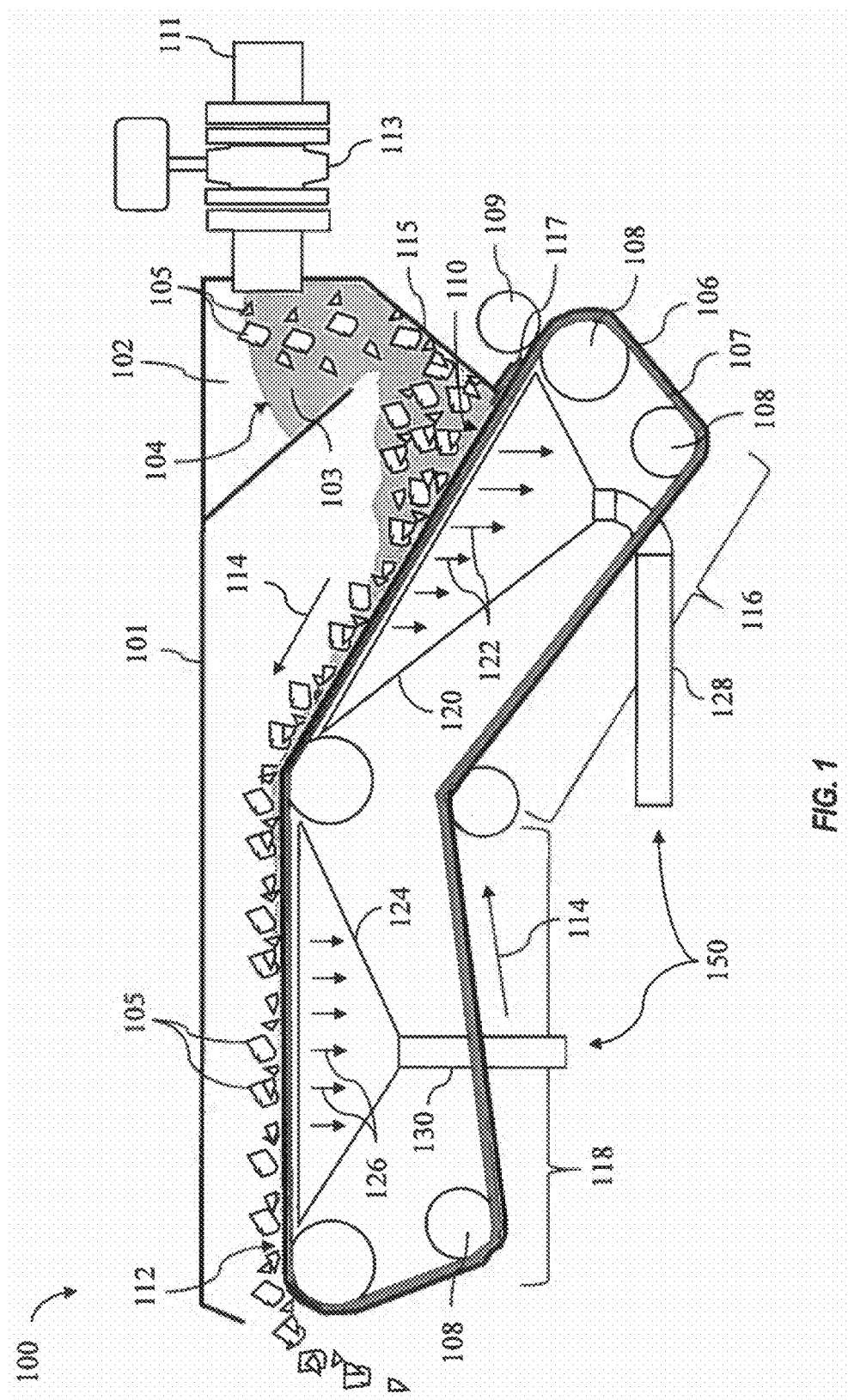
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact.

FIG. 1 is a schematic view of an example implementation of a solid and fluid material separator 100 according to one or more aspects of the present disclosure. The separator 100 may have an inlet 102 through which a fluid carrying solid particles and other material (collectively referred to hereinafter as a "slurry" 104) may be fed or otherwise introduced into the separator 100. The separator 100 may include one or more continuous filter (e.g., screen, mesh) belts 106 guided by a plurality of hanger rollers 108. One or more of the rollers 108 may be driven or rotated by a motor (not shown), such as an electric motor, a hydraulic motor, a pneumatic motor, among other examples, to advance (i.e., rotate) the filter belt 106 about the rollers 108, as indicated by arrows 114. The moving filter belt 106 may substantially continuously receive and convey the slurry from a loading end 110 of the filter belt 106 toward an unloading end 112 of the filter belt 106 from which the solid particles may be expelled from the separator 100.

The slurry 104 within the scope of the present disclosure may comprise fluids such as hydrocarbons, drilling fluid, weighting agents, water, lost circulation material and/or other fluids present in a wellbore (not shown), such as gas and oil. The slurry may also comprise solids carried by the fluids, such as may include rock or formation cuttings, dust, and other solid particles present in the wellbore. The separator 100 may separate the slurry 104 into different portions. For example, a portion of the slurry 104 may be sized to pass through the filter belt 106 of the separator 100 and may include fluids and fine solid particles below a predetermined size carried by the fluids. Such portion of the slurry 104 is referred to hereinafter as a fluid portion 103 of the slurry 104. A portion of the slurry 104 may be sized to be conveyed by the filter belt 106 to be expelled at the unloading end 112 of the filter belt 106 and may include solid particles above a predetermined size that may not pass through the filter belt 106. Such portion of the slurry 104 is referred to hereinafter as a solids portion 105 of the slurry 104. The filter belt 106 may comprise a single layer of woven mesh wire or screen or may comprise multiple layers of woven mesh wire or screen. The filter belt 106 may have apertures of a predetermined size. For example, the size of the apertures may be selected to separate the fluid portion 103 of the slurry 104 from the solids portion 105 of the slurry 104. During slurry separation operations, the fluid portion 103 of the slurry 104 may pass or move through the filter belt 106 into one or more collection trays or pans 120, 124, while the solids portion 105 of the slurry 104 may be blocked from moving through the filter belt 106 and may be expelled at the unloading end 112 of the filter belt 106.

The inlet 102 may receive the slurry 104 via a fluid conduit 111, which may be fluidly connected with the wellbore or another source containing the slurry 104. The conduit 111 may include a fluid valve 113, which may be selectively opened and closed to permit and prevent flow of the slurry 104 into the separator via the inlet 102. The fluid valve 113 may be or comprise a fluid shut-off valve or the fluid valve 113 may instead be or comprise flow rate control valve operable to progressively or gradually open and close to control the flow rate of the slurry 104. The fluid valve 113 may be or comprise a ball valve, a globe valve, or a butterfly valve, among other examples. The inlet 102 may be or comprise a material chute operable to receive the slurry 104 discharged from the conduit 111 and direct a stream of slurry 104 onto the loading end 110 of the filter belt 106.

The separator 100 may be further operable to generate and/or impart vibrational motion to the filter belt 106 to aid in separating the fluid portion 103 of the slurry 104 from the solids portion 105. For example, an unbalanced or otherwise vibrating motor (not shown) may be connected to a frame 101 of the separator 100, such as may impart vibrational motion to the rollers 108 and the filter belt 106 conveying the slurry 104. The inlet 102, the rollers 108, the motors, and other portions of the separator 100 may be held in place or otherwise operatively connected to the frame 101.

The filter belt 106 may be supported or reinforced by a carrier belt 107, which may be surrounded by or disposed underneath the filter belt 106. Similarly to the filter belt 106, the carrier belt 107 may be guided by the plurality of rollers 108 and, thus, advanced or driven by the motor, as indicated by the arrows 114. The carrier belt 107 may comprise a chain, a screen, or a mesh that is substantially coarser and sturdier than the screen or mesh of the filter belt 106. The carrier belt 107 may be operable to support the filter belt 106 and reduce physical damage to the filter belt 106 caused by tension, pressure, friction imparted to the filter belt 106 by the slurry 104 during separation operations.

The filter belt 106 (and perhaps the carrier belt 107) may have an inclined portion 116 comprising the loading end 110 and a horizontal portion 118 comprising the unloading end 112. The inclined portion 116 may utilize gravity to enhance flow of the fluid portion 103 (i.e., fluid and fine solid particles) of the slurry 104 through the filter belt 106. For example, the inclined portion 116 may utilize gravity to cause the fluid portion 103 to flow downwardly along the filter belt 106 collecting at or near the unloading end 112 of the filter belt 106 while permitting the solids portion 105 (i.e., larger solid particles such as cuttings) of the slurry 104 to be conveyed toward the horizontal portion 118. A retaining wall 115 of the inlet 102 or the frame 101 may maintain the slurry 104 at the loading end 110 of the filter belt 106. For example, the retaining wall 115 may minimize gap or space between the retaining wall 115 and the filter belt 106 to block or reduce the flow of slurry 104 downwardly along the filter belt 106 past the retaining wall 115. Such gap or space may contain one or more sealing members 117, such as gaskets, strips, lip seals, or other flexible members operable to contact and fluidly seal against the moving filter belt 106. A seal roller 109 may also or instead be installed adjacent the retaining wall 115 and in contact with the filter belt 106. The seal roller 109 may compress the filter belt 106 before the retaining wall 115 and/or block or reduce the flow of slurry 104 through the gap or space between the retaining wall 115 and the filter belt 106.

The fluid portion 103 of the slurry 104 collected at or near the loading end 110 may result in an increased fluid pressure across the filter belt 106, such as may help or cause the fluid portion 103 to pass through the filter belt 106 and flow into the collection pan 120, as indicated by arrows 122. The fluid portion 103 may then be conveyed via a conduit 128 to a container (such as a separation tank 160 shown in FIG. 2) or another destination for further processing and subsequent injection into the wellbore.

The horizontal portion 118 of the filter belt 106 may convey the solids portion 105 of the slurry 104 and remaining fluid portion 103 horizontally to provide additional time for gravity to force the remaining fluid portion 103 to pass through the filter belt 106 and flow into the collection pan 124, as indicated by arrows 126. The fluid portion 103 captured by the pan 124 may then be conveyed via a conduit 130 to a container (such as a separation tank 160 shown in FIG. 2) or another destination for further processing and subsequent injection into the wellbore. Once the solids portion 105 of the slurry 104 reaches the unloading end 112 of the filter belt 106, the solids portion 105 may be expelled from the filter belt 106 into a container or another destination (not shown) for removal.

One or more of the pans 120, 124 and the corresponding conduits 128, 130 may form a portion of a pressure differential system 150 operatively connected with the separator 100. However, the pressure differential system 150 may form a portion of the separator 100. The pressure differential system 150 may be operable to decrease air pressure on one side of the filter belt 106 to increase pressure differential across (i.e., between upper and lower surfaces) the filter belt 106. The increased pressure differential may force (i.e., draw, suck) the fluid portion 103 of the slurry 104 to pass through the filter belt 106 into the corresponding pans 120, 124 or increase the rate at which the fluid portion 103 passes through the filter belt 106. The increase in pressure differential across the filter belt 106 may be caused by, for example, introducing vacuum (i.e., suction) into one or more of the pans 120, 124 via the corresponding conduits 128, 130.

Rims or upper edges of the pans 120, 124 may be positioned in close proximity to corresponding bottom surfaces of the filter belt 106 (and perhaps the carrier belt 107) as the filter belt 106 advances, such as to minimize gaps or spaces between the pans 120, 124 and the filter belt 106 to minimize air flowing into the pans 120, 124 through such gaps or along areas other than through the filter belt 106. The gaps between the pans 120, 124 and the filter belt 106 may contain sealing members (not shown), such as gaskets, strips, lip seals, or other flexible members operable to contact and fluidly seal against the moving filter belt 106 and/or the carrier belt 107.

The vacuum introduced to one or more of the pans 120, 124 may be applied at a substantially constant or uniform manner and/or the vacuum may be applied at a substantially fluctuating or pulsating manner. For example, the vacuum applied to the pan 120 may be substantially constant, such as to facilitate substantially constant application of suction to the slurry 104 carried by the filter belt 106. The vacuum applied to the pan 124 may be pulsating (i.e., applied momentarily or intermittently at predetermined intervals), such as to facilitate substantially repetitious momentary application of suction to the slurry 104 carried by the filter belt 106. When the vacuum is not applied to the pan 124, the solids portion 105 of the slurry carried on the filter belt 106 may be permitted to flip over or roll, loosening or separating the fluid portion 103 (i.e., fine solid particles and fluid) of the slurry 104 from the solids portion 105 (i.e., larger solid particles) of the slurry 104 as the filter belt 106 vibrates. When the vacuum is again applied to the pan 124, the vacuum may draw the fluid portion 103 located on the surface of the filter belt 106 through the filter belt 106 and into the pan 124. The vacuum may also draw or remove the fluid portion 103 adhering to "wetted" surfaces of the solids portion 105 off of such surfaces when in contact with the filter belt 106. When the vacuum is turned off again, the solids portion 105 carried on the filter belt 106 may be again flipped over or rolled by the vibration action to loosen or separate additional fluid portion 103 adhering to the solids portion 105 and to orient different "wetted" surfaces of the solids portion 105 into contact with the filter belt 106, exposing such surfaces to the vacuum. Accordingly, the portion of the filter belt 106 above the pan 120 may be considered as a fluid flow enhancement area and the portion of the filter belt 106 above the pan 124 may be considered a cuttings drying area.

Figure 2:
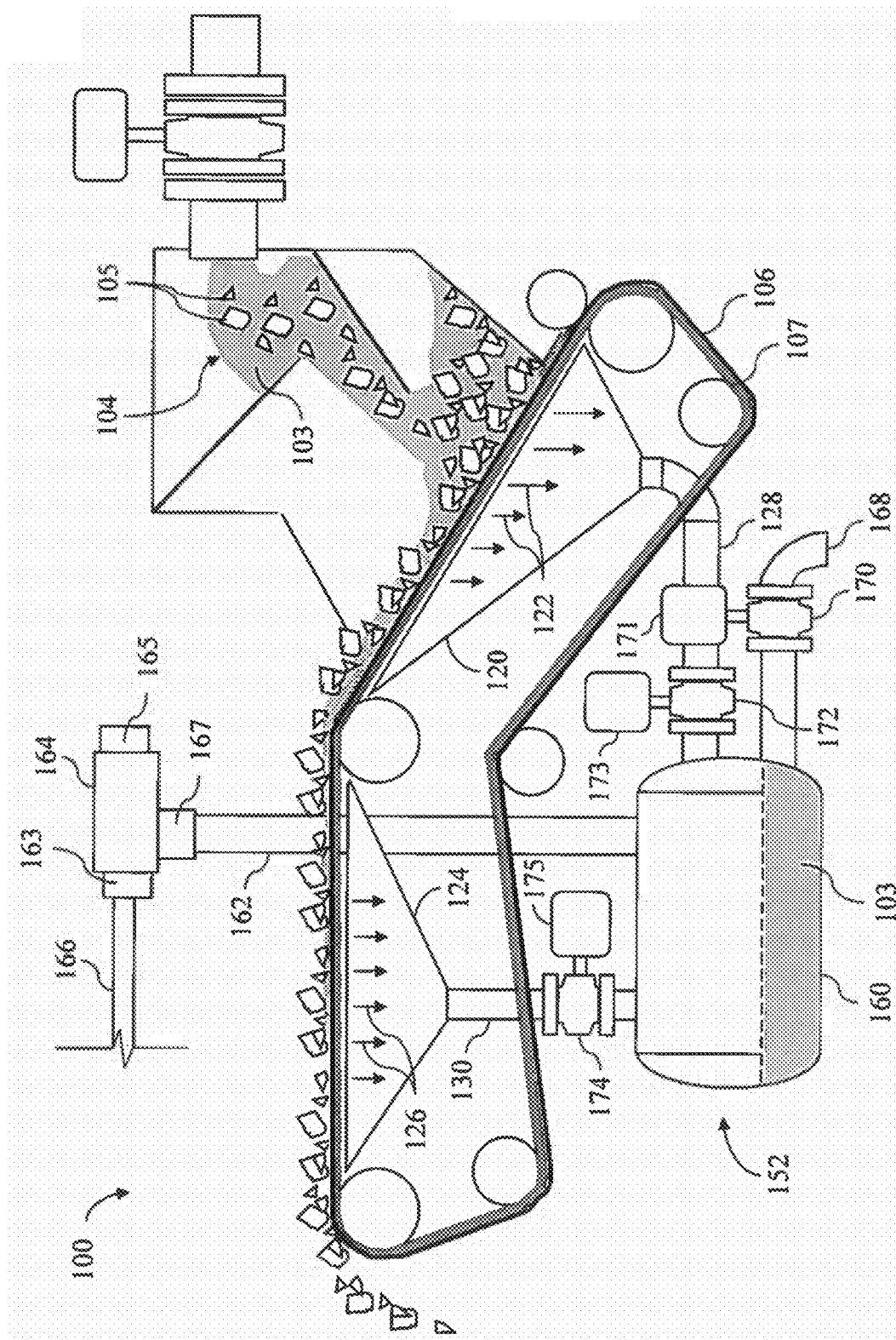
FIG. 2 is a schematic view of at least a portion of an example implementation of apparatus according to one or more aspects of the present disclosure.

FIG. 2 is a schematic view of the separator 100 shown in FIG. 1 operatively connected with an example implementation of a pressure differential system 152 according to one or more aspects of the present disclosure. The pressure differential system 152 may comprise one or more similar features of the pressure differential system 150, including where indicated by like reference numbers. The pressure differential system 152 may comprise a fluid and air separation tank 160 fluidly connected with the conduits 128, 130. The separation tank 160 may be fluidly connected with a vacuum source 164 via a fluid conduit 162. The vacuum source 164 may be or comprise one or more compressed air driven venturi vacuum generators or other vacuum generators or pumps known in the art. During slurry separation operations, compressed air may be directed into an inlet port 163 of the vacuum source 164 via a conduit 166 and exhausted into the atmosphere via an exhaust port 165, resulting in generation of vacuum (i.e., suction) at a suction port 167 of the vacuum source 164. The vacuum may be applied to the separation tank 160 via the conduit 162. The vacuum may draw the fluid portion 103 of the slurry 104 into the pans 120, 124 and the separation tank 160, where the fluid portion 103 may settle or collect at the bottom thereof. The fluid portion 103 may be periodically drained via a drain 168, which may be selectively opened and closed via a fluid valve 170.

Fluid valves 172, 174 may be fluidly connected along the conduits 128, 130, respectively, to control the application of vacuum to the corresponding pans 120, 124. One or more of the valves 170, 172, 174 may be or comprise fluid shut-off valves which may be selectively opened and closed to permit and prevent flow of the fluid portion 103 of the slurry 104 into and out of the separation tank 160. However, one or more of the valves 170, 172, 174 may instead be or comprise flow rate control valves operable to progressively or gradually open and close to control the flow rate of the fluid portion 103 of the slurry 104. The valves 170, 172, 174 may be or comprise needle valves, ball valves, globe valves, butterfly valves, among other examples. Each fluid valve 170, 172, 174 may be actuated remotely by an actuator 171, 173, 175 operatively coupled with the corresponding fluid valve 170, 172, 174. The actuators 171, 173, 175 may be or comprise electric actuators, such as solenoids or motors, or fluid actuators, such as pneumatic or hydraulic cylinders or rotary actuators. The fluid valves 170, 172, 174 may also be actuated manually, such as by a knob or lever (not shown).

The fluid valve 170 may be selectively opened and closed to selectively drain the fluid portion 103 of the slurry 104 from the separation tank 160 and the fluid valves 172, 174 may be selectively opened and closed to selectively apply vacuum to the pans 120, 124 and permit flow of the fluid portion 103 into the separation tank 160. For example, the actuators 171, 173, 175 may be in signal communication with a controller (such as the controller 400 shown in FIG. 17), which may be operable to selectively operate the fluid valves 170, 172, 174 between open and closed positions. The controller may, for example, cause the fluid valve 172 to remain substantially continuously open to apply vacuum to the pan 120 in a substantially constant or uniform manner, as described above. The controller may, for example, cause the fluid valve 174 to momentarily or intermittently opened at predetermined intervals to apply vacuum to the pan 124 in a substantially fluctuating or pulsating manner, as described above.

Figure 3:
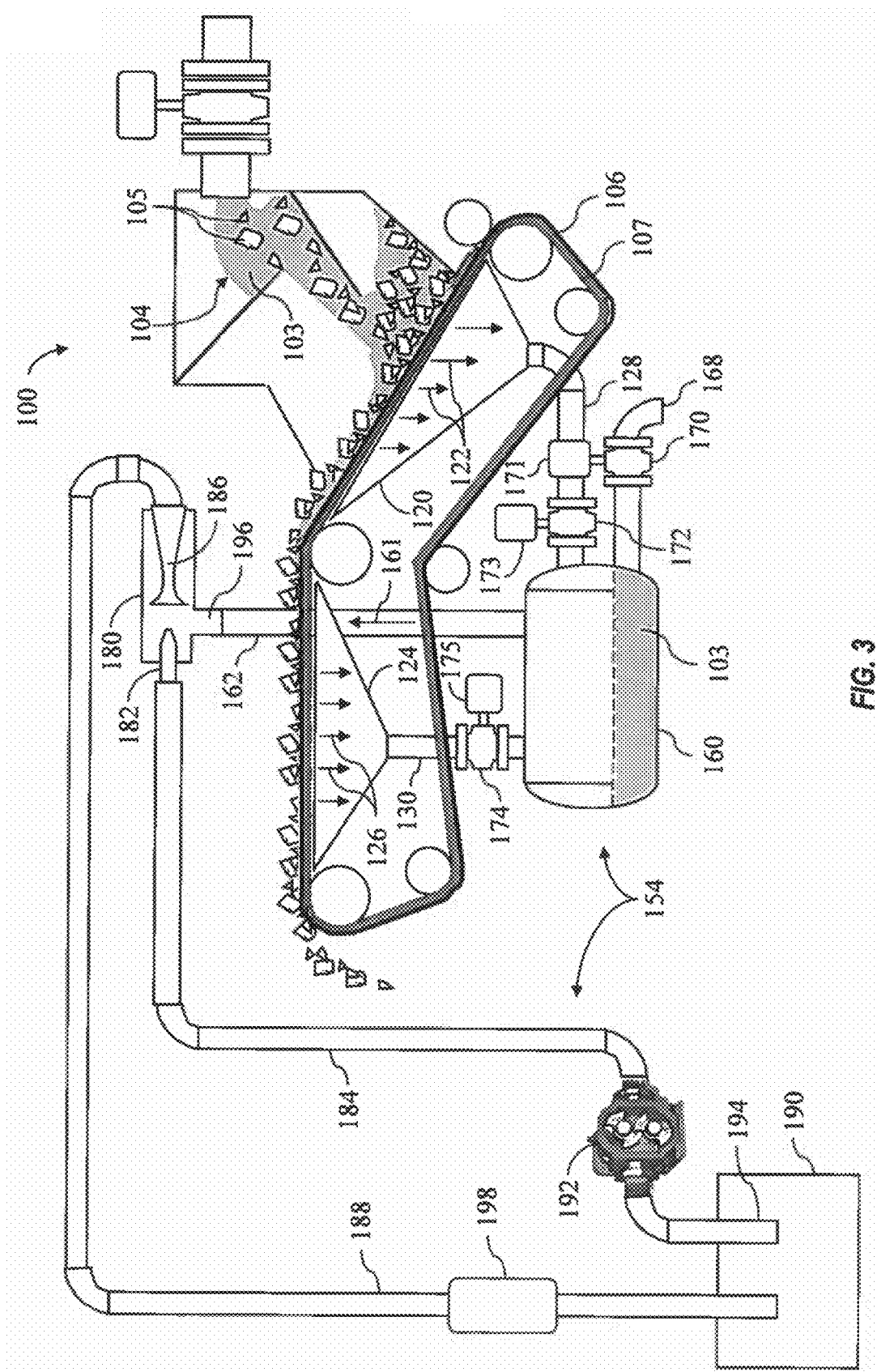
FIG. 3 is a schematic view of at least a portion of an example implementation of apparatus according to one or more aspects of the present disclosure.

FIG. 3 is a schematic view of the separator 100 shown in FIG. 1 operatively connected with an example implementation of a pressure differential system 154 according to one or more aspects of the present disclosure. The pressure differential system 154 may comprise one or more similar features of the pressure differential systems 150, 152 including where indicated by like reference numbers. Instead of the vacuum source 164, the pressure differential system 154 may comprise a vacuum source 180 fluidly connected with the fluid conduit 162. The vacuum source 180 may be or comprise one or more fluid driven eductors or other fluid driven vacuum generators or pumps. A nozzle 182 of the vacuum source 180 may be fluidly connected with a source of pressurized fluid via a fluid supply conduit 184 and a diffuser 186 of the vacuum source 180 may be fluidly connected with a fluid destination via a fluid discharge conduit 188. The source of the pressurized fluid may be or comprise a fluid pump 192 fluidly connected with a fluid container 190 via a suction conduit 194. The fluid destination may be or comprise the fluid container 190.

During slurry separation operations, the fluid pumped by the pump 192 may be directed by the nozzle 182 into and through the diffuser 186, resulting in generation of vacuum (i.e., suction) at a suction port 196 of the vacuum source 180. The vacuum may be applied to the separation tank 160 via the conduit 162. The vacuum may draw the fluid portion 103 of the slurry 104 into the pans 120, 124 and the separation tank 160, where the fluid portion 103 may settle or collect at the bottom thereof. Some of the fluid portion 103 received into the separation tank 160 may become airborne during the slurry separation operations and remain airborne within the separation tank 160. Such airborne particles (e.g., dust, mist) may be drawn into the vacuum source 180 via the conduit 162, as indicated by arrow 161. Once within the vacuum source 180, the airborne particles may be drawn into and captured by the fluid within or downstream from the diffuser 186 and carried by the fluid into the fluid container 190. A filter 198 may be connected along the conduit 188 or another portion of the pressure differential system 154 to filter or collect the particles of the fluid portion 103 of the slurry 104 captured by the fluid. The fluid utilized to drive the vacuum source 180 may be or comprise a liquid, such as water, oil, a brine solution, among other examples.

Figure 4:
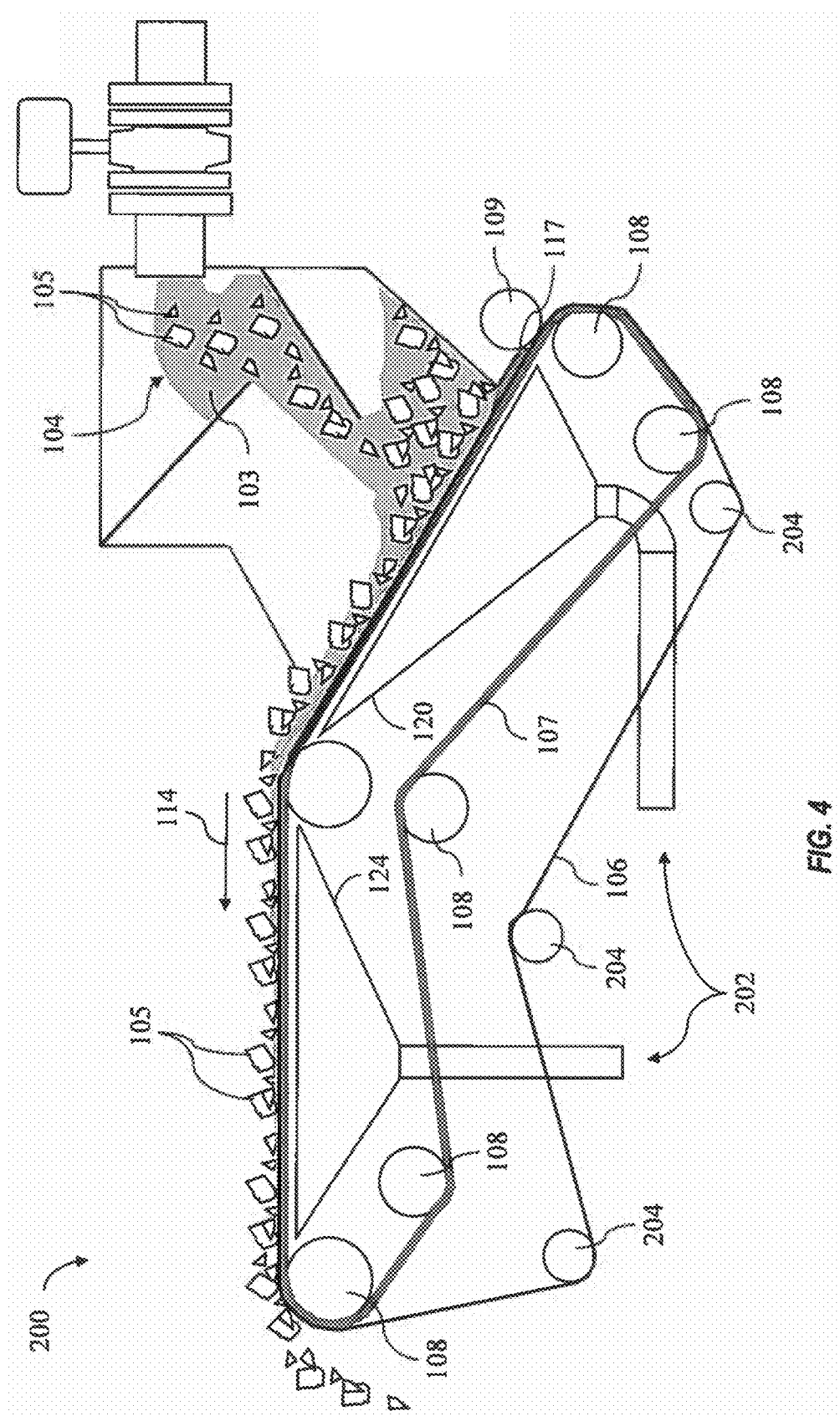
FIG. 4 is a schematic view of at least a portion of an example implementation of apparatus according to one or more aspects of the present disclosure.

FIG. 4 is a schematic view of a separator 200 and the pressure differential system 202 operatively connected with the separator 200 according to one or more aspects of the present disclosure. The separator 200 may comprise one or more similar features of the separator 100 shown in FIGS. 1-3 including where indicated by like reference numbers. The pressure differential system 202 may comprise one or more similar features of the pressure differential systems 150, 152, 154 shown in FIGS. 1-3 including where indicated by like reference numbers.

Unlike the separator 100, the separator 200 may be operable to at least partially separate the filter belt 106 from the carrier belt 107 as the belts 106, 107 advance during the separation operations. For example, the separator 200 may comprise additional hanger rollers 204 operable to guide the filter belt 106 away from the carrier belt 107 and, thus, separate the filter belt 106 from the carrier belt 107. The rollers 204 may be located below or otherwise at a distance from the rollers 108, such as may permit the filter belt 106 to be substantially longer than the carrier belt 107. Increasing the length of the filter belt 106 increases cumulative surface area of the filter belt 106, such as may facilitate increased distribution of wear and tear experienced by the filter belt 106 and, thus, facilitate increased operational life of the filter belt 106. Separation of the filter belt 106 from the carrier belt 107 may also permit independent tensioning of the filter belt 106 and the carrier belt 107.

Figure 5:
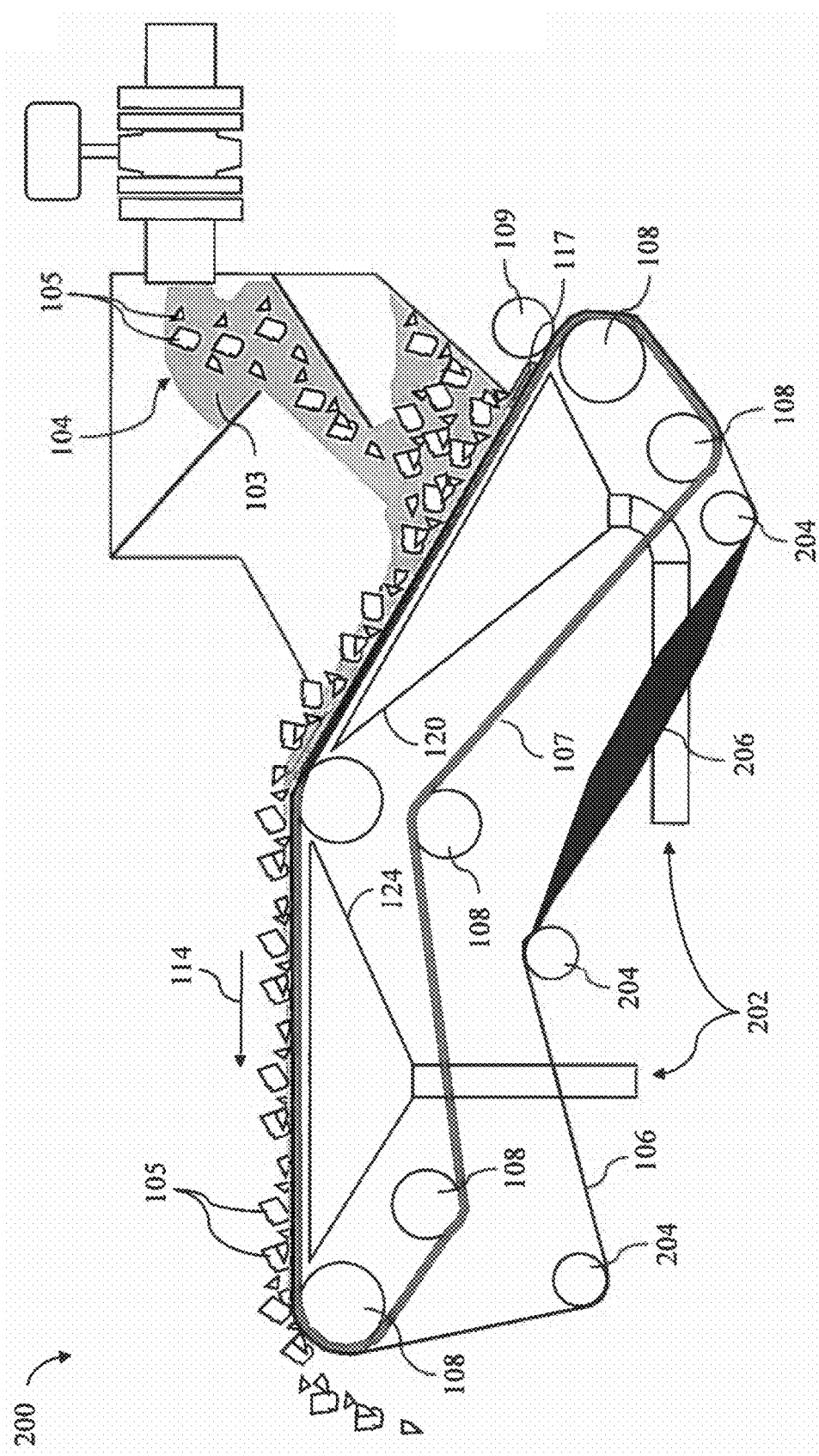
FIG. 5 is a schematic view of at least a portion of an example implementation of apparatus according to one or more aspects of the present disclosure.

FIG. 5 is a schematic view of the separator 200 and the pressure differential system 202 shown in FIG. 4 according to one or more aspects of the present disclosure. As shown in FIG. 5, orientation of the filter belt 106 may be inverted or reversed, as indicated by numeral 206, such as may permit bidirectional flow (i.e., passage, filtration) of the fluid portion 103 of the slurry through the filter belt 106. Reversing flow through the filter belt 106 may help unclog the apertures in the screen or mesh of the filter belt 106, which may become clogged by fine solid particles of the slurry 104. Inverting the filter belt 106 may also double surface area of the filter belt 106 that receives and carries the slurry 104, facilitating increased distribution of wear and tear experienced by the filter belt 106 and, thus, facilitating increased operational life of the filter belt 106. The filter belt 106 may be inverted 206 between adjacent rollers 204.

The filter belt 106 may be inverted, for example, by disconnecting or opening the filter belt 106 loop to form opposing ends of the filter belt 106, twisting one end of the filter belt 106 by 180 degrees, and connecting the ends. The resulting loop essentially comprises the shape of a Mobius strip. FIGS. 6-9 are enlarged views of a portion of example implementations of the filter belt 106 shown in FIGS. 1-5 according to one or more aspects of the present disclosure.

Figure 6:
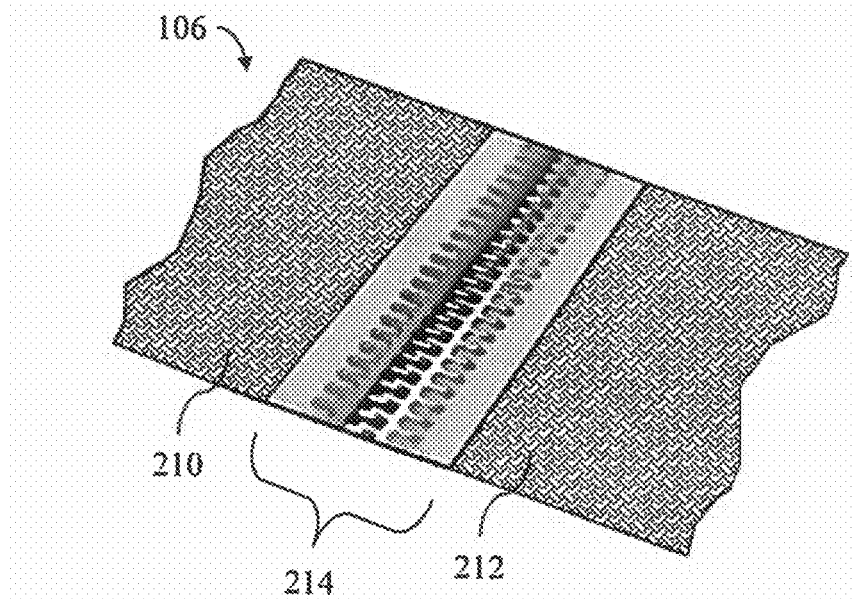
FIG. 6 is a schematic view of at least a portion of an example implementation of apparatus according to one or more aspects of the present disclosure.
Figure 7:
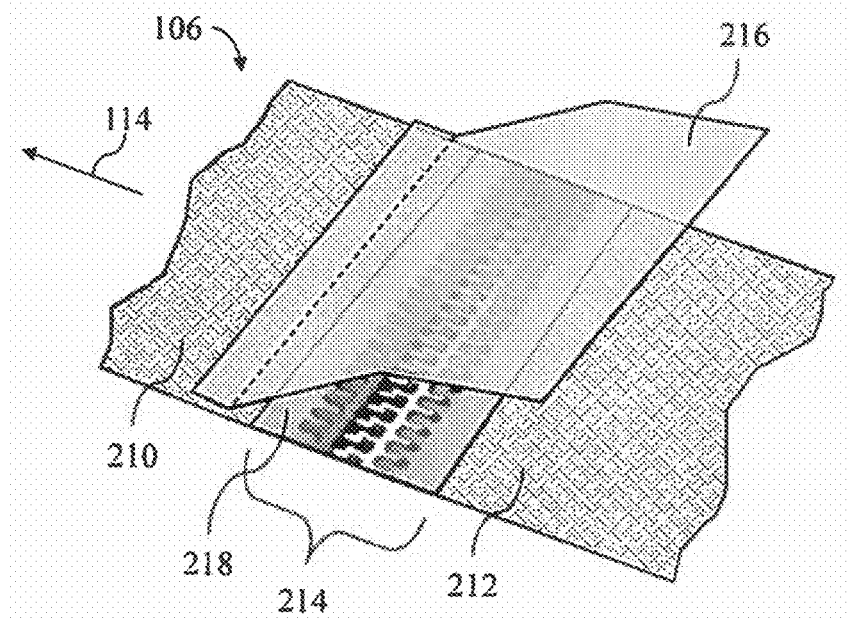
FIG. 7 is a schematic view of an example implementation of the apparatus shown in FIG. 6 according to one or more aspects of the present disclosure.

Referring now to FIGS. 6 and 7, the filter belt 106 may comprise opposing ends 210, 212 connected together by a zipper assembly 214 to form an endless or continuous loop according to one or more aspects of the present disclosure. A flap or segment of flexible sealing material 216 may be connected to the end 210, such that the sealing material 216 extends about or past the zipper assembly 214. The sealing material 216 may protect the zipper assembly 214 from contact with the slurry 104, including the solids portion 105 (i.e., larger solid particles), which may jam or otherwise damage the zipper assembly 214. The sealing material 216 may be connected to the end 210 of the filter belt 106 on the leading side 218 of the zipper assembly 214. The leading side 218 of the zipper assembly 214 is oriented in the direction of motion of the filter belt 106 indicated by the arrow 114.

Figure 8:
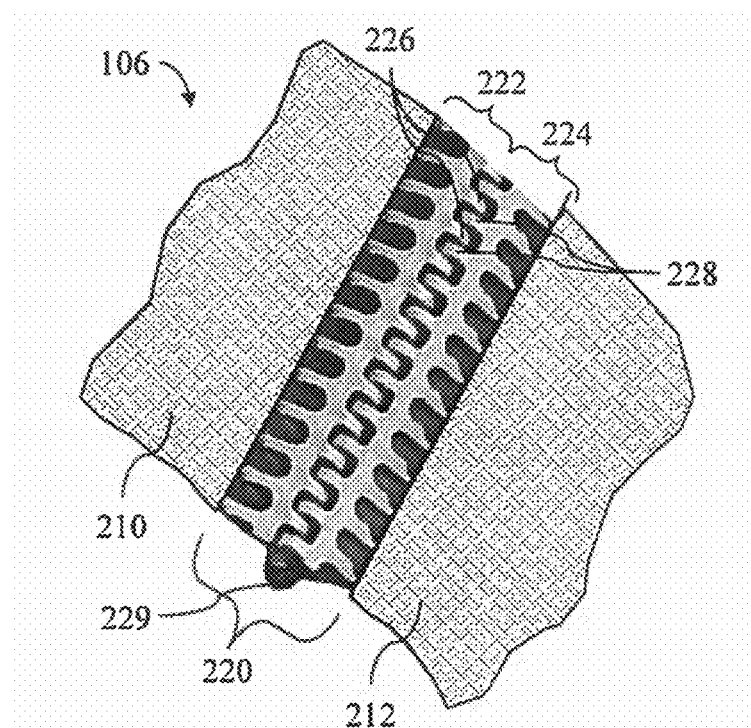
FIG. 8 is a schematic view of at least a portion of an example implementation of apparatus according to one or more aspects of the present disclosure.

Referring now to FIG. 8, the filter belt 106 may comprise opposing ends 210, 212 connected together by a zipper assembly 220 to form an endless or continuous loop according to one or more aspects of the present disclosure. The zipper assembly 220 may comprise opposing elongated interlocking elements 222, 224, each connected with a corresponding end 210, 212 of the filter belt 106 and comprising a plurality of corresponding loops 226, 228, which may be joined together by a pin 229 extending through the corresponding sets of loops 226, 228 to connect the opposing ends 210, 212 of the filter belt 106.

Figure 9:
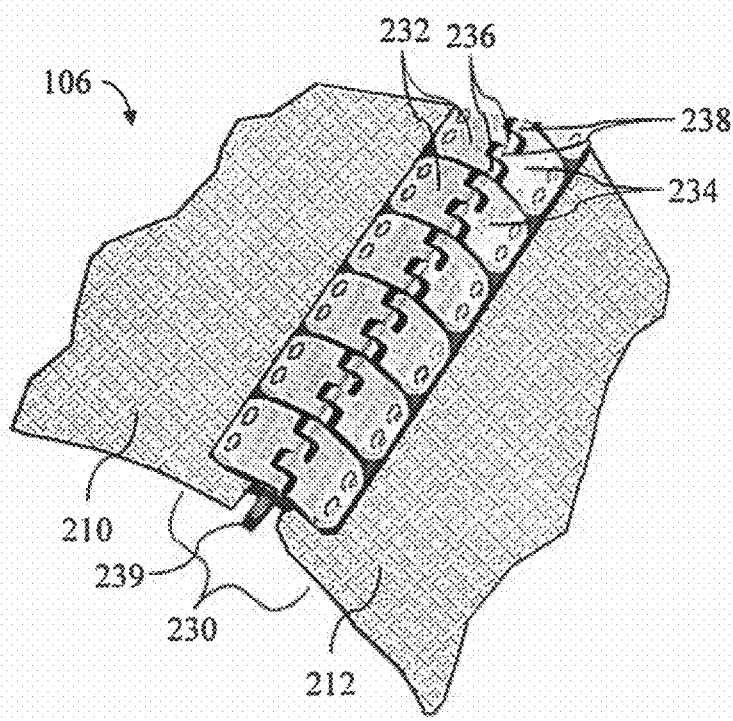
FIG. 9 is a schematic view of at least a portion of an example implementation of apparatus according to one or more aspects of the present disclosure.

Referring now to FIG. 9, the filter belt 106 may comprise opposing ends 210, 212 connected together by a zipper assembly 230 to form an endless or continuous loop according to one or more aspects of the present disclosure. The zipper assembly 230 may comprise a plurality of opposing interlocking elements 232, 234, each connected with a corresponding end 210, 212 of the filter belt 106 and comprising a plurality of corresponding loops 236, 238, which may be joined together by a pin 239 extending through the corresponding sets of loops 236, 238 to connect the opposing ends 210, 212 of the filter belt 106.

Figure 10:
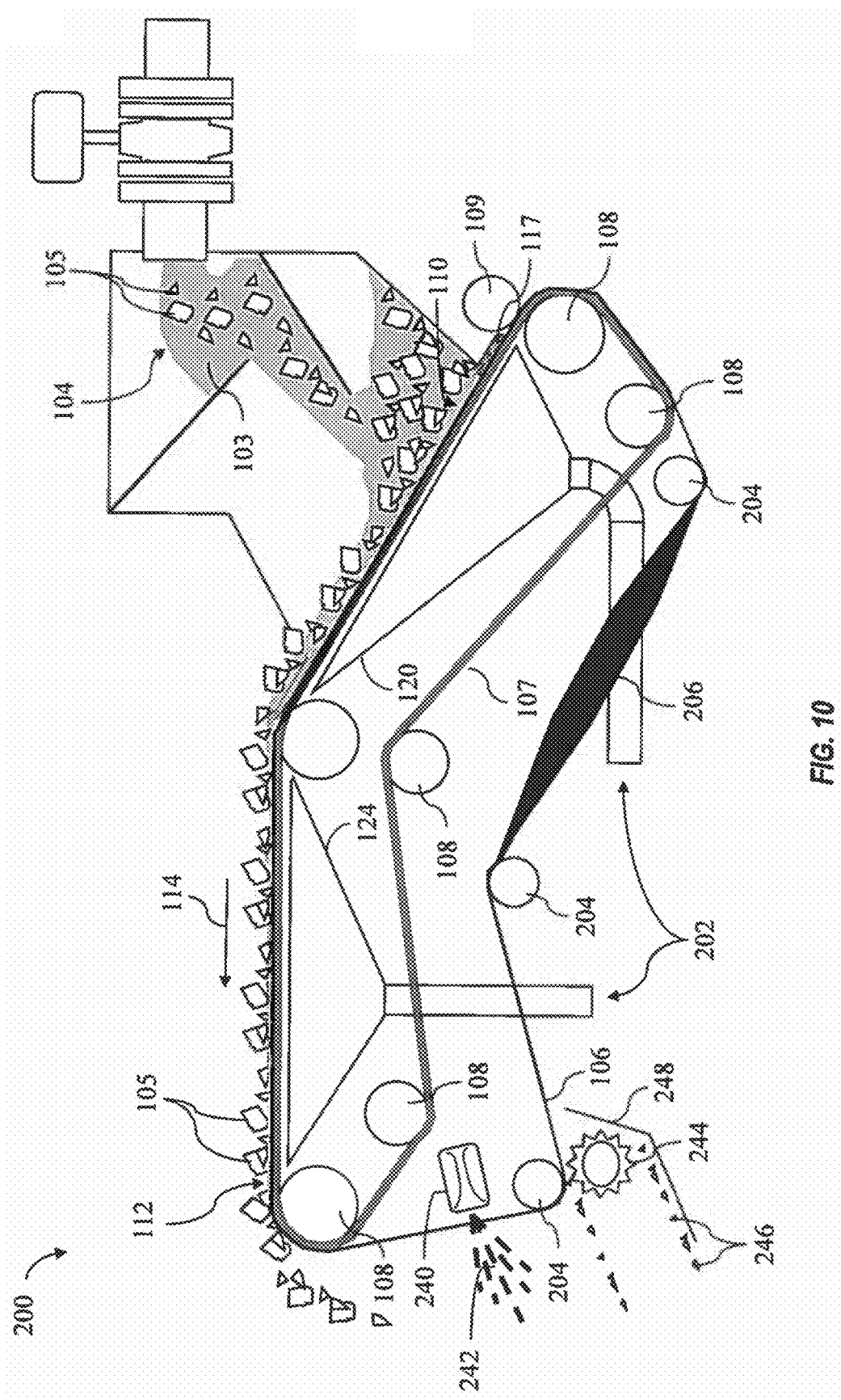
FIG. 10 is a schematic view of at least a portion of an example implementation of apparatus according to one or more aspects of the present disclosure.

FIG. 10 is a schematic view of the separator 200 and the pressure differential system 202 shown in FIGS. 4 and 5 according to one or more aspects of the present disclosure. The separator 200 may further comprise one or more filter belt cleaning devices operable to clean, unclog, or otherwise remove remaining solids and/or fluid portions 103, 105 of the slurry 104 from the filter belt 106 after the solids portion 105 of the slurry 104 is expelled from the unloading end 112 of the filter belt 106, but before additional slurry 104 is introduced onto the filter belt 106 at the loading end 210.

The separator 200 may include a cleaning nozzle 240 fluidly connected with a source of cleaning fluid (not shown) and operable to discharge a jet or stream 242 of cleaning fluid onto and/or through the filter belt 106 separated from the carrier belt 107. The stream 242 may be applied to the filter belt 106 substantially continuously or intermittently to wash away the solids and/or fluid portions 103, 105 of the slurry 104 trapped within or otherwise carried by the filter belt 106. The separator 200 may further include a mechanical brush 244 disposed in contact with the surface of the filter belt 106 separated from the carrier belt 107. The mechanical brush 244 may be operable to mechanically remove remaining fine solid particles 246 that may be trapped within or otherwise carried by the filter belt 106. A protective guard 248 may direct the dislodged fine solid particles 246 away from the separator 200 or another intended direction.

Figure 11:
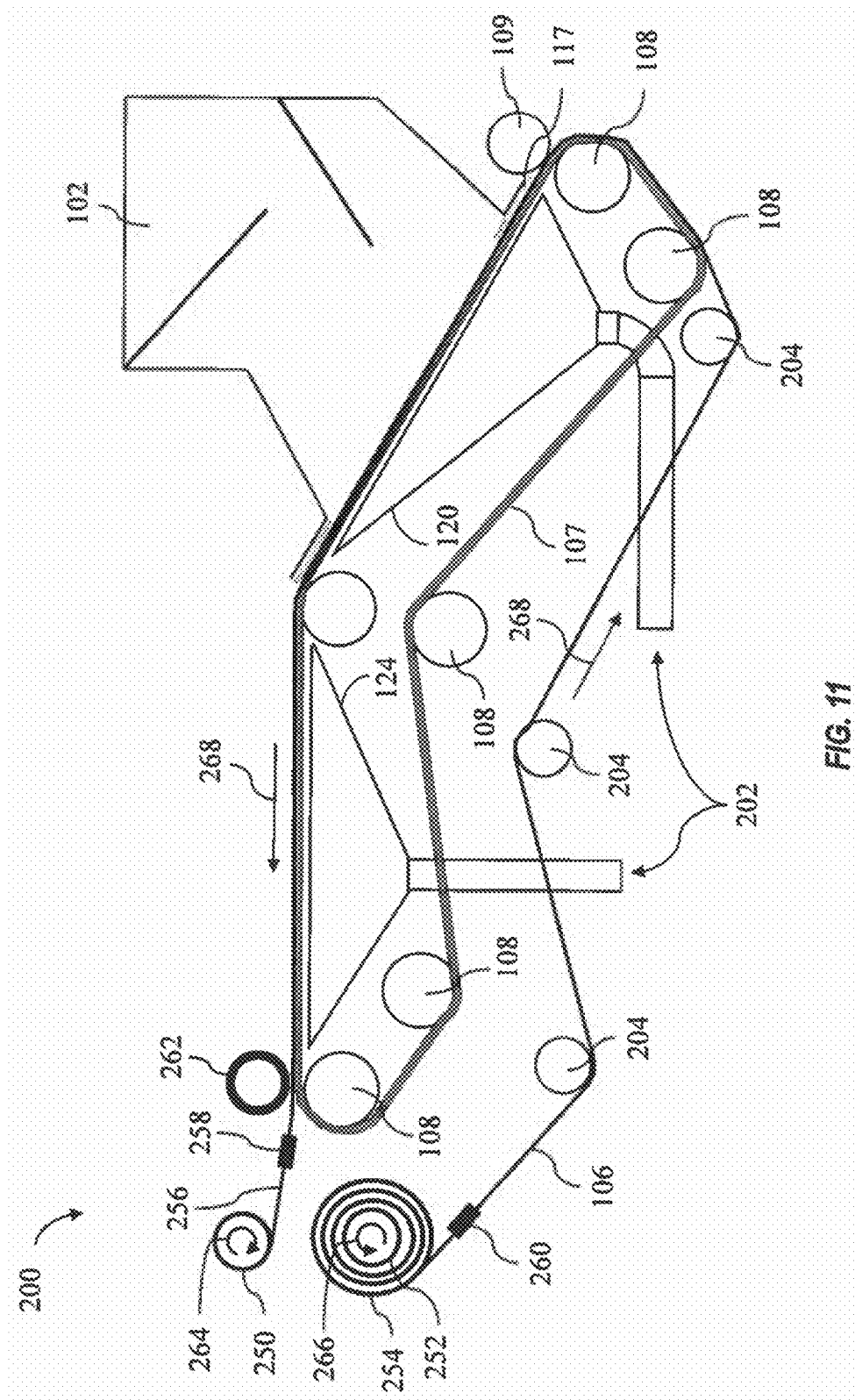
FIG. 11 is a schematic view of at least a portion of an example implementation of apparatus according to one or more aspects of the present disclosure.
Figure 12:
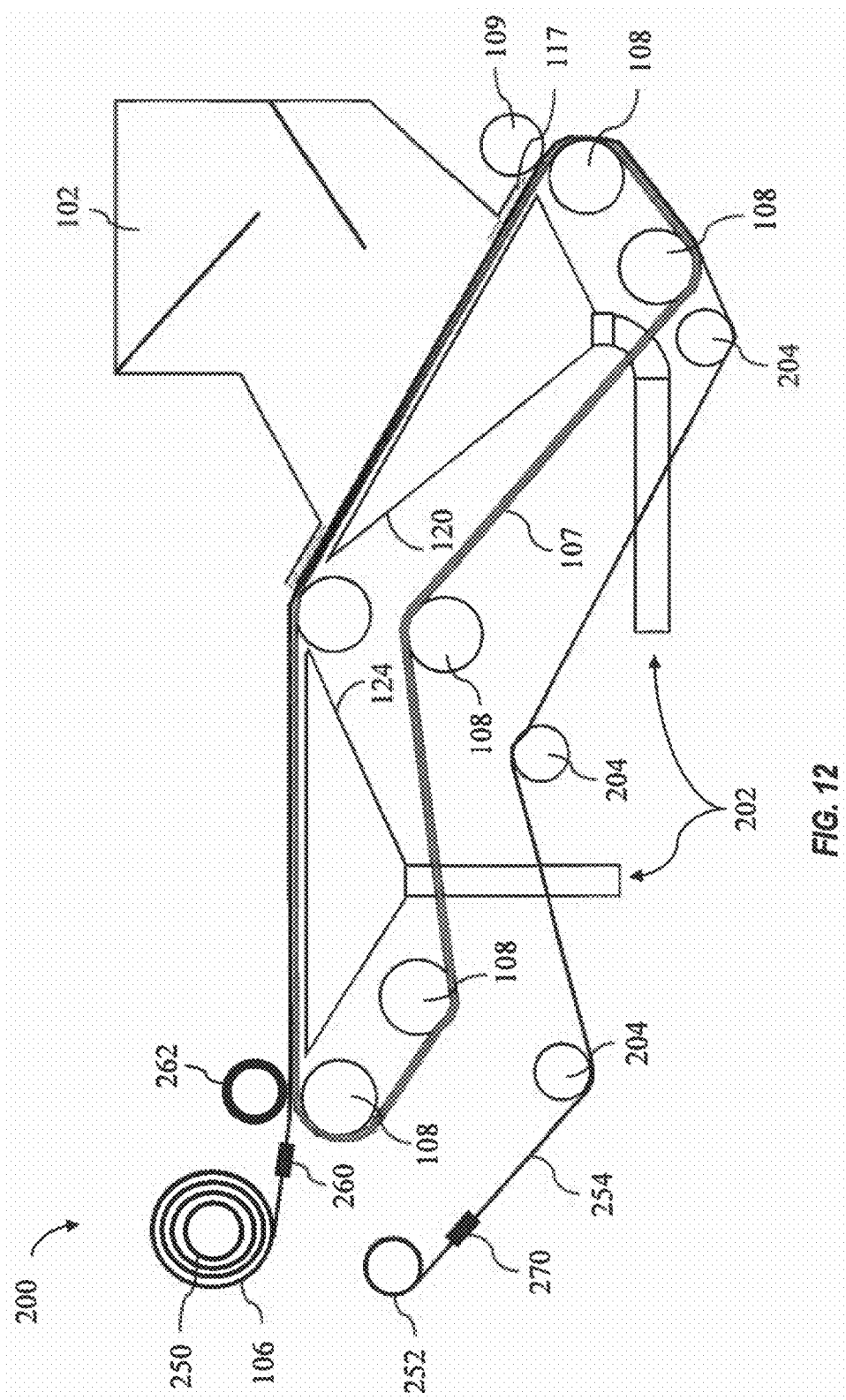
FIG. 12 is a schematic view of the apparatus shown in FIG. 11 in another operational stage according to one or more aspects of the present disclosure.
Figure 13:
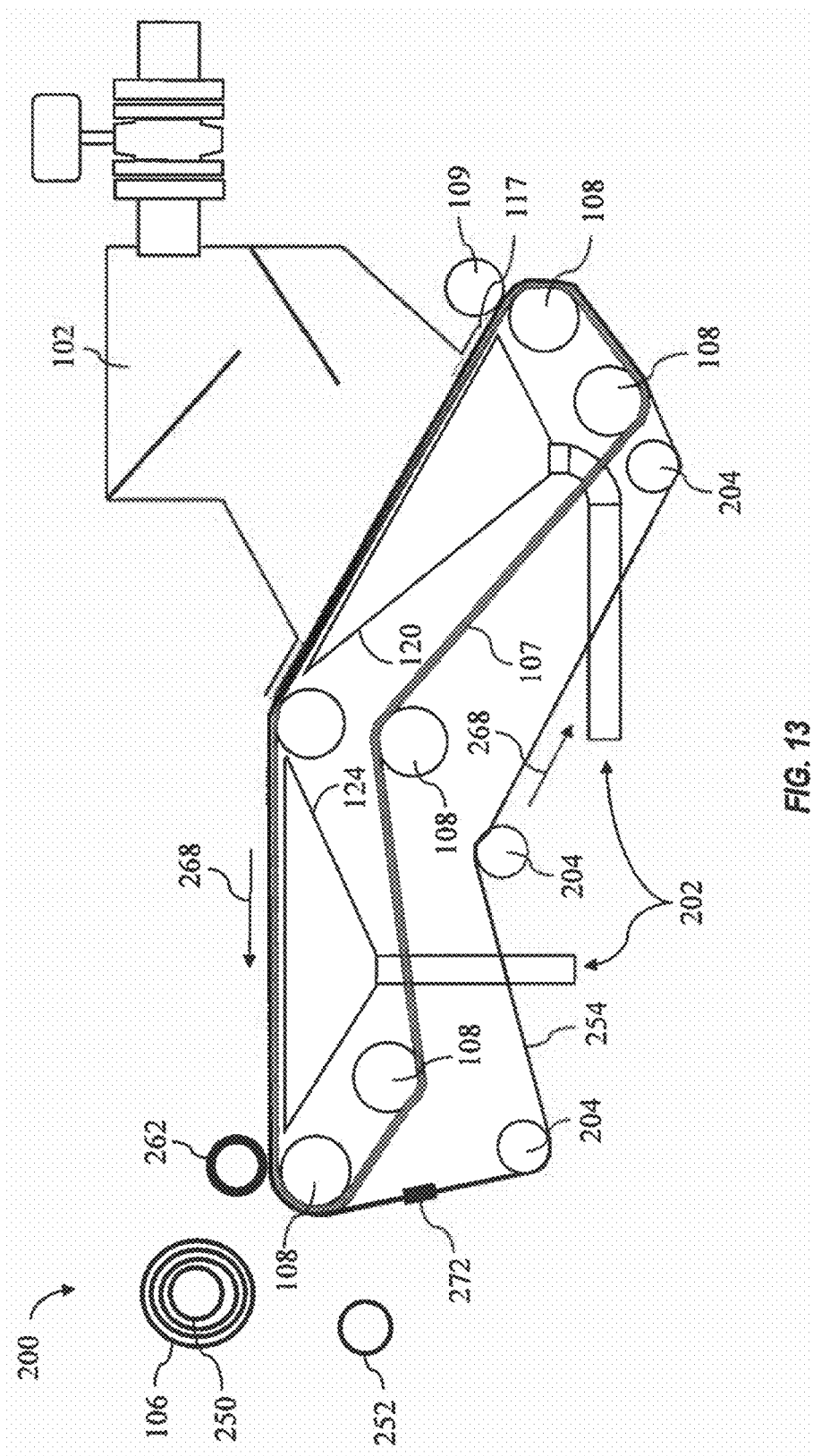
FIG. 13 is a schematic view of the apparatus shown in FIGS. 11 and 12 in another operational stage according to one or more aspects of the present disclosure.

FIGS. 11-13 are schematic views of the separator 200 and the pressure differential system 202 shown in FIGS. 4, 5, and 10 during successive operational stages to change out the filter belt 106 according to one or more aspects of the present disclosure. FIG. 11 shows a receiving roller 250 and a dispensing roller 252 having a roll of new filter belt 254 disposed thereon. The used filter belt 106 may be opened, permitting one end of the filter belt 106 to be connected with a belt extension 256 (perhaps a previously used filter belt) disposed on or connected to the receiving roller 250. The filter belt 106 may be connected with the belt extension 256 via a zipper assembly 258 while the opposing end of the filter belt 106 may be connected with the new filter belt 254 via a zipper assembly 260. Once the filter belt 106 is connected with the belt extension 256 and the new filter belt 254, the receiving roller 250 may be rotated as indicated by arrow 264 to receive the used filter belt 106 and unwind the new filter belt 254 off of the dispensing roller 252, as indicated by arrow 266, onto the rollers 108, 204, as indicated by arrows 268. During the filter belt change out operations, a soft pinch roller 262 may be utilized to maintain the used filter belt 106 in contact with the adjacent roller 108 and the carrier belt 107 as the used filter belt 106 is pulled out of the separator 200.

FIG. 12 shows the separator 200 in a subsequent operational stage wherein the used filter belt 106 is rolled onto the receiving roller 250 and the new filter belt 254 is unwound off of the dispensing roller 252 and onto the rollers 108, 204. Thereafter, the zipper assembly 260 and a zipper assembly 270 may be disengaged to free the opposing ends of the new filter belt 254, such as may permit the opposing ends of the new filter belt 254 to be connected. FIG. 13 shows the separator 200 in a subsequent operational stage wherein the opposing ends of the new filter belt 254 are connected via a zipper assembly 272 and, thus, ready to commence the separation operations. Prior to connecting the opposing ends of the new filter belt 254, one of the ends of the filter belt 254 may be twisted 180 degrees and then connected, as described above, to facilitate inversion of the new filter belt 254 during separation operations.

Figure 14:
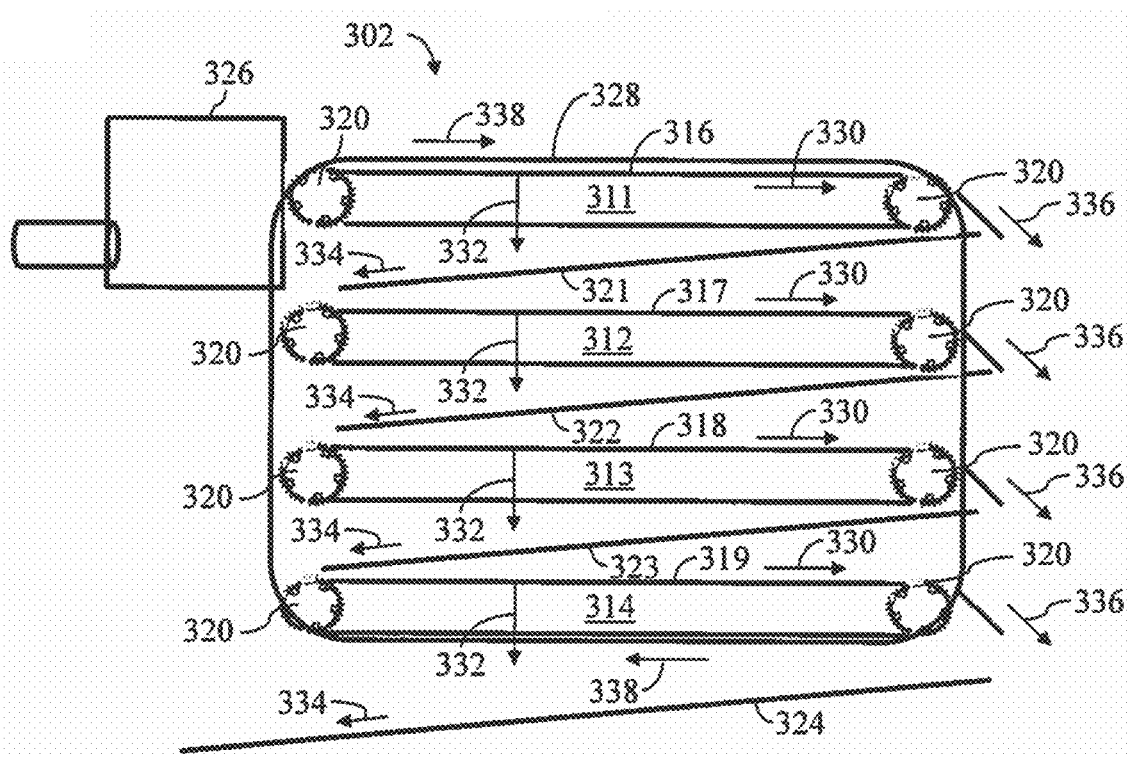
FIG. 14 is a schematic view of at least a portion of an example implementation of apparatus according to one or more aspects of the present disclosure.
Figure 15:
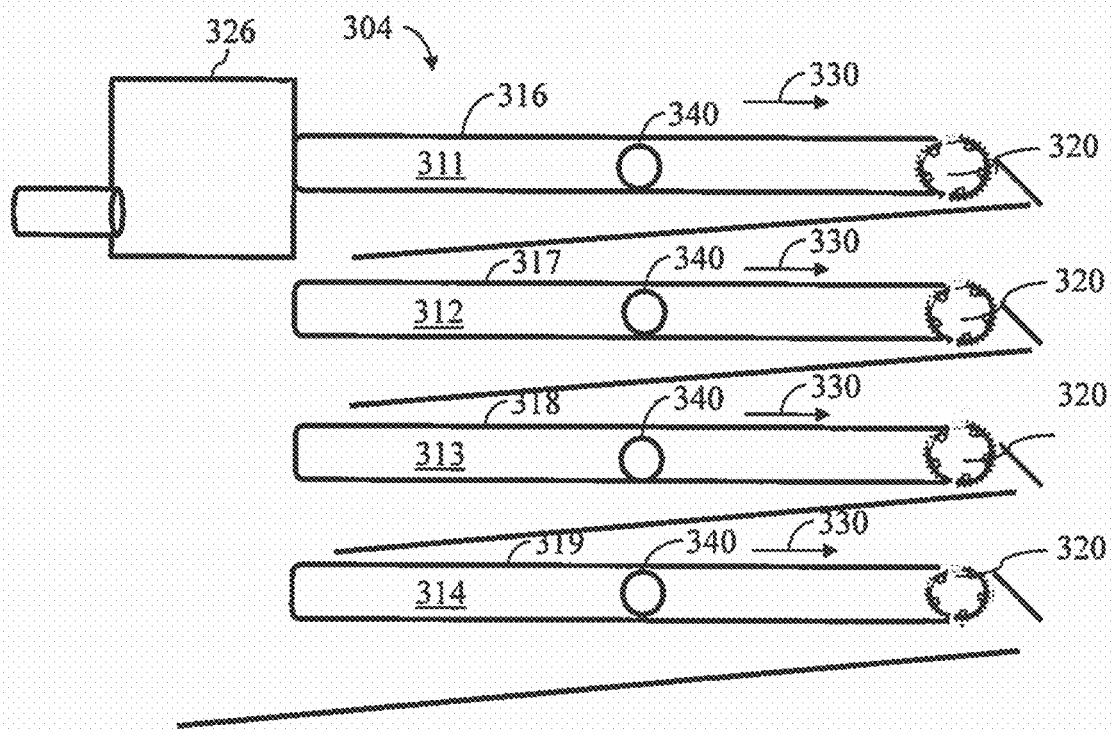
FIG. 15 is a schematic view of at least a portion of an example implementation of apparatus according to one or more aspects of the present disclosure.
Figure 16:
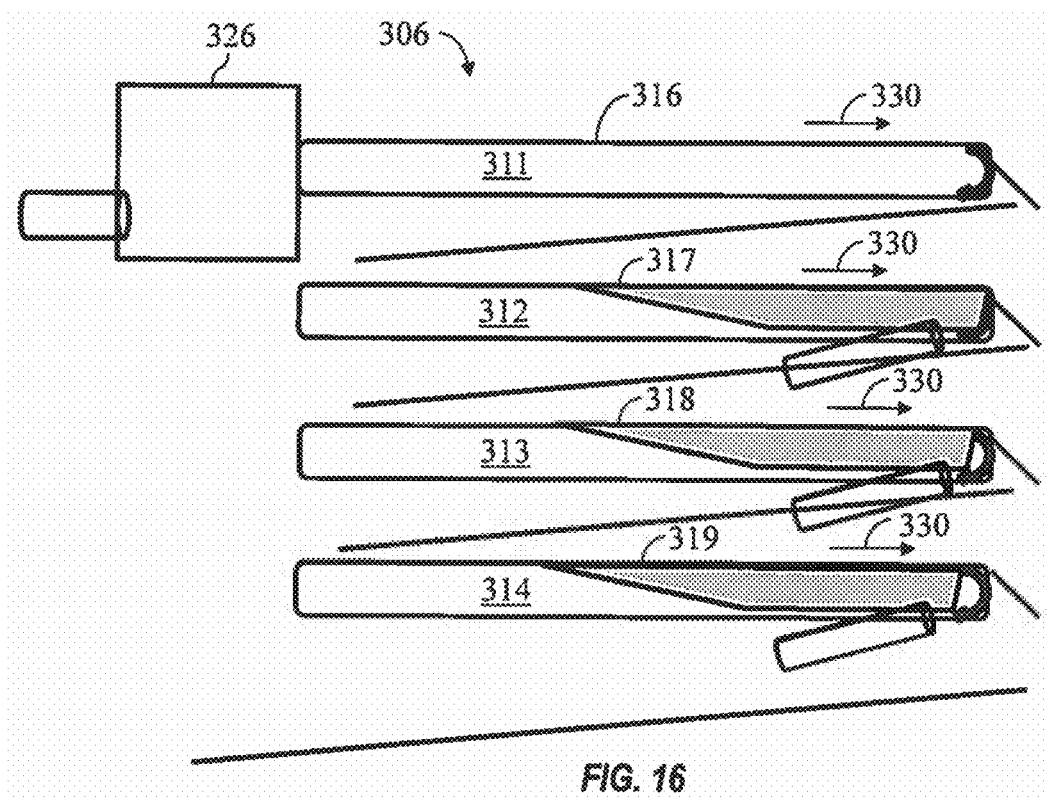
FIG. 16 is a schematic view of at least a portion of an example implementation of apparatus according to one or more aspects of the present disclosure.

The various features of the separators 100, 200 and the pressure differential systems 150, 152, 154 described above may be applicable to multiple deck separators. FIGS. 14-16 are schematic views example implementations of multiple deck separators according to one or more aspects of the present disclosure.

FIG. 14 is a schematic view of a multiple deck separator 302 comprising a plurality of separator decks 311-314 located a different levels. Each deck 311-314 may comprise a filter belt 316-319 extending and rotated about corresponding rollers 320, as indicated by arrows 330. An inlet 326 may receive slurry and direct the slurry onto the first filter belt 316, through which a fluid portion of the slurry may pass twice to separate from solid portion of the slurry, which may remain on a surface of the filter belt 316. The path of the fluid portion of the slurry passing twice through opposing surfaces of the filter belt 316 is indicated by arrow 332. The fluid portion of the slurry passing through the filter belt 316 may be directed onto the second filter belt 317 of the second deck 312 via a flow back pan 321, as indicated by arrow 334, while the solid portion of the slurry remaining on the surface of the filter belt 316 may be expelled off of an end of the first deck 311, as indicated by arrow 336, as the filter belt 316 rotates. Such process may be repeated, with the fluid portion of the slurry being successively directed onto the remaining filter belts 317-319 via corresponding back pans 322-324, as indicated by the arrows 334, and passing twice through each filter belt 317-319, as indicated by the arrows 332. The solid portion of the slurry may be expelled from the decks 312-314 as the filter belts 317-319 rotate about the rollers 320, as indicated by the arrows 336. The rollers 320 may be driven by a single continuous belt or chain drive 328 operatively connected with the rollers 320 and rotating as indicated by arrows 338. The chain drive 328 may be fully protected from the slurry and human operators.

FIG. 15 is a schematic view of a multiple deck separator 304 comprising a plurality of separator decks 311-314 located a different levels. The separator 304 may comprise one or more similar features of the separator 302 shown in FIG. 13, including where indicated by like reference numbers. Each deck 311-314 may comprise a filter belt 316-319 extending and rotated about corresponding rollers 320, as indicated by arrows 330. Unlike the separator 302, each filter belt 316-319 may be driven (i.e., rotated) independently, via a corresponding variable drive motor 340, which may permit each deck 311-314 to convey the slurry at speeds and/or angles independent of the other decks 311-314.

FIG. 16 is a schematic view of a multiple deck separator 306 comprising a plurality of separator decks 311-314 located a different levels. The separator 306 may comprise one or more similar features of the separators 302, 304 shown in FIGS. 13 and 14, respectively, including where indicated by like reference numbers. Each deck 311-314 may comprise a filter belt 316-319 extending and rotated about corresponding rollers (not shown). Each deck 311-314 may comprise an increasingly fine filter belt 316-319. For example, the filter belt 316 may be or comprise a coarse chain drive, which may be similar to a Gumbo chain. The filter belt 317 may be or comprise a screen belt having an API screen size ranging between about 20 and 30. The filter belt 318 may be or comprise a screen belt having an API screen size ranging between about 100 and 170. The filter belt 319 may be or comprise a screen belt having an API screen size ranging between about 200 and 325. Each screen belt 317-319 may comprise a screen pulse.

Figure 17:
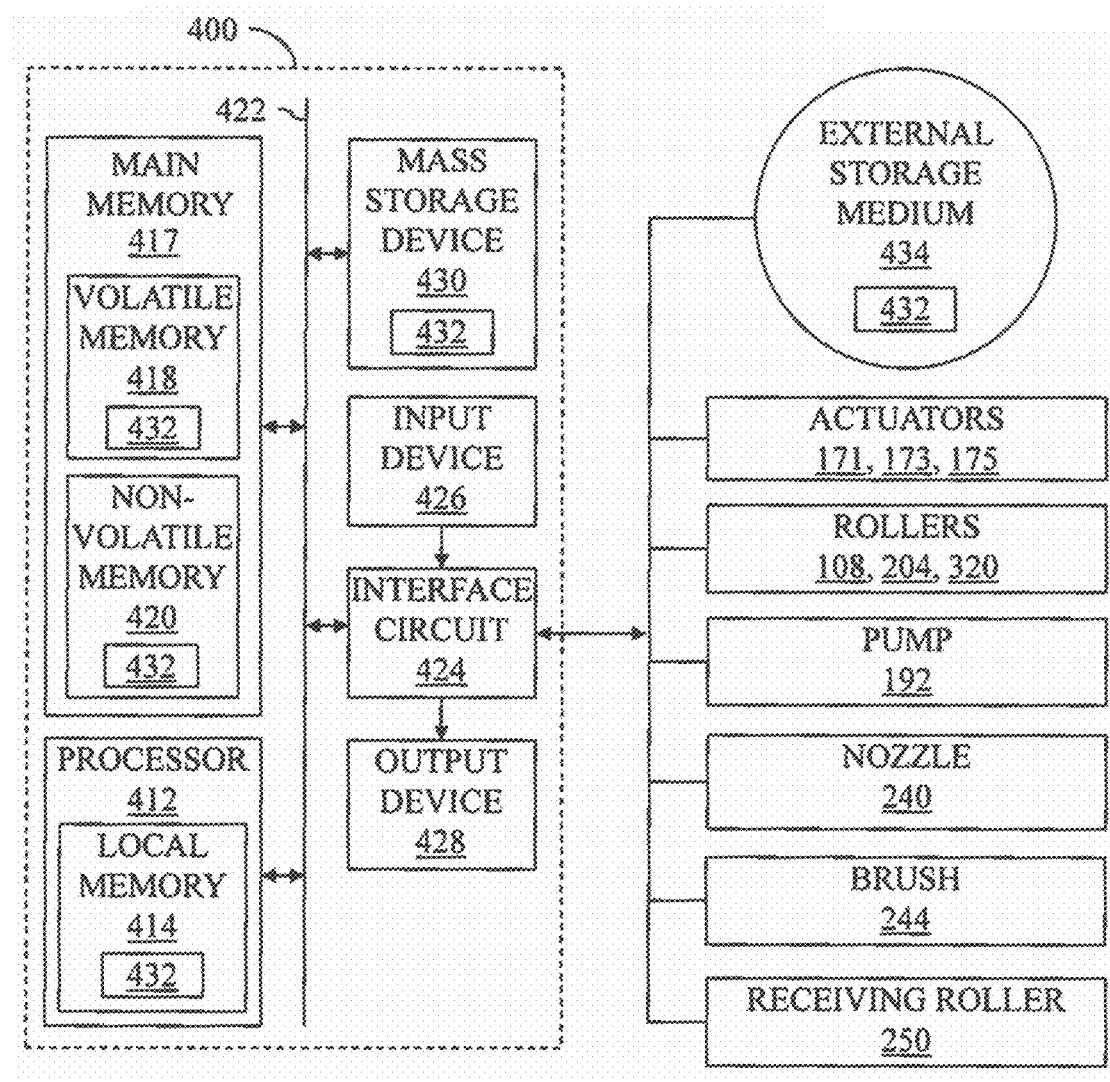
FIG. 17 is a schematic view of at least a portion of an example implementation of apparatus according to one or more aspects of the present disclosure.

Various portions of the apparatuses described above and shown in FIGS. 1-16 may be controlled by or operate in conjunction with a controller. FIG. 17 is a schematic view of at least a portion of an example implementation of a controller 400 in signal communication with one or more portions of the separators 100, 200, 302, 304, 306 and/or the pressure differential systems 150, 152, 154 shown in FIGS. 1-16 according to one or more aspects of the present disclosure. The following description refers to one or more of FIGS. 1-17.

The controller 400, which may be in communication with various portions of the separators 100, 200, 302, 304, 306 and the pressure differential systems 150, 152, 154. For example, the controller 400 may be in signal communication with the actuators 171, 173, 175 of the fluid valves 170, 172, 174, the rollers 108, 204, 320 the pump 192, the nozzle 240, the brush 244, the receiving roller 250, various motors and other actuators associated with the rollers 108, 204, the pump 192, the nozzle 240, the brush 244, the motors 340, and various sensors associated with the separators 100, 200, 302, 304, 306 and the pressure differential systems 150, 152, 154. For clarity, these and other components in communication with the controller 400 will be collectively referred to hereinafter as "sensor and actuator equipment."

The controller 400 may be operable to receive coded instructions 432 from the human operator and signals generated the sensor equipment, process the coded instructions 432 and the signals, and communicate control signals to the actuator equipment to execute the coded instructions 432 to implement at least a portion of one or more example methods and/or processes described herein, and/or to implement at least a portion of one or more of the example systems described herein.

The controller 400 may be or comprise, for example, one or more processors, special-purpose computing devices, servers, personal computers (e.g., desktop, laptop, and/or tablet computers) personal digital assistant (PDA) devices, smartphones, internet appliances, and/or other types of computing devices. The controller 400 may comprise a processor 412, such as a general-purpose programmable processor. The processor 412 may comprise a local memory 414, and may execute coded instructions 432 present in the local memory 414 and/or another memory device. The processor 412 may execute, among other things, the machine-readable coded instructions 432 and/or other instructions and/or programs to implement the example methods and/or processes described herein. The programs stored in the local memory 414 may include program instructions or computer program code that, when executed by an associated processor, facilitate the separator 100, 200, 302, 304, 306 and the pressure differential system 150, 152, 154 to perform the example methods and/or processes described herein. The processor 412 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 412 may be in communication with a main memory 417, such as may include a volatile memory 418 and a non-volatile memory 420, perhaps via a bus 422 and/or other communication means. The volatile memory 418 may be, comprise, or be implemented by a tangible, non-transitory storage medium, such as random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 420 may be, comprise, or be implemented by a tangible, non-transitory storage medium, such as read-only memory, flash memory, and/or other types of memory devices. One or more memory controllers (not shown) may control access to the volatile memory 418 and/or non-volatile memory 420.

The controller 400 may also comprise an interface circuit 424. The interface circuit 424 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 424 may also comprise a graphics driver card. The interface circuit 424 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the sensor and actuator equipment may be connected with the controller 400 via the interface circuit 424, such as may facilitate communication between the sensor and actuator equipment and the controller 400.

One or more input devices 426 may also be connected to the interface circuit 424. The input devices 426 may permit the human operators to enter the coded instructions 432, including control commands, operational set-points, and/or other data for use by the processor 412. The operational set-points may include, as non-limiting examples, the manner of operation of the actuators 171, 173, 175 of the fluid valves 170, 172, 174, including frequency or duration of operation. The input devices 426 may be, comprise, or be implemented by a keyboard, a mouse, a touchscreen, a track-pad, a trackball, an isopoint, and/or a voice recognition system, among other examples.

One or more output devices 428 may also be connected to the interface circuit 424. The output devices 428 may be, comprise, or be implemented by display devices (e.g., a liquid crystal display (LCD), a light-emitting diode (LED) display, or cathode ray tube (CRT) display), printers, and/or speakers, among other examples. The controller 400 may also communicate with one or more mass storage devices 430 and/or a removable storage medium 434, such as may be or include floppy disk drives, hard drive disks, compact disk (CD) drives, digital versatile disk (DVD) drives, and/or USB and/or other flash drives, among other examples.

The coded instructions 432 may be stored in the mass storage device 430, the main memory 417, the local memory 414, and/or the removable storage medium 434. Thus, the controller 400 may be implemented in accordance with hardware (perhaps implemented in one or more chips including an integrated circuit, such as an ASIC), or may be implemented as software or firmware for execution by the processor 412. In the case of firmware or software, the implementation may be provided as a computer program product including a non-transitory, computer-readable medium or storage structure embodying computer program code (e.g., software or firmware) thereon for execution by the processor 412.

The coded instructions 432 may include program instructions or computer program code that, when executed by the processor 412, may cause the separator 100, 200, 302, 304, 306 and the pressure differential system 150, 152, 154 to perform methods, processes, and/or routines described herein. For example, the controller 400 may receive, process, and record the operational set-points entered by the human operator and based on the received operational set-points and sensor signals, the controller 400 may send control signals or information to the actuator 173 to operate the fluid valve 172 such that the vacuum is applied to the pan 120 in substantially constant or uniform manner. The controller 400 may send control signals or information to the actuator 175 to operate the fluid valve 174 such that the vacuum is applied to the pan 124 in substantially fluctuating or pulsating manner.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to allow the reader to quickly ascertain the nature of the technical disclosure. It is submitted with the understanding that it will not be used to interpret or limit the scope or meaning of the claims.

What is claimed is:

1. A materials separator comprising:
   a frame;
   an inlet at a first end of the materials separator;
   a first deck comprising:
      a first set of rollers including:
         a first roller positioned at the first end of the materials separator; and
         a second roller positioned at a second end of the materials separator opposite the first end of the materials separator;
      a first continuous filter belt disposed around the first set of rollers and extending between the first roller and the second roller;
      a first deck top surface extending between the first roller and the second roller and defined by the first continuous filter belt;
      a first deck bottom surface extending between the first roller and the second roller and defined by the first continuous filter belt, wherein the first deck bottom surface is positioned below the first deck top surface such that a first fluid path of a fluid flows from the inlet, downward through the first continuous filter belt at the first deck top surface to separate first solids from the fluid, and downward from the first deck top surface through the first continuous filter belt at the first deck bottom surface; and
      a first solids outlet at the second end of the materials separator for expelling the first solids separated from the fluid off the first continuous filter belt and over the second roller at the second end of the materials separator;
   a second deck disposed below the first deck, the second deck comprising:
      a second set of rollers positioned beneath the first set of rollers, the second set of rollers including:
         a third roller positioned at the first end of the materials separator; and
         a fourth roller positioned at the second end of the materials separator;
      a second continuous filter belt disposed around the second set of rollers such that a second fluid path of the fluid flows downward through the second deck to separate second solids from the fluid; and
      a second solids outlet at the second end of the materials separator for expelling the second solids separated from the fluid off the second continuous filter belt and over the fourth roller at the second end of the materials separator;
   a flowback pan positioned between the first deck bottom surface of the first deck and the second deck and angled downward from the second end toward the first end such that a flowback fluid path of the fluid flows from the first fluid path at the first deck bottom surface, downward along the flowback pan and to the second fluid path at the second deck; and
   a drive device configured to rotate at least one roller of each of the first set of rollers and the second set of rollers.

2. The materials separator of claim 1, further comprising a pressure differential system operatively coupled to the first deck and configured to adjust a pressure differential across the first continuous filter belt.

3. The materials separator of claim 2, further comprising a controller in signal communication with the pressure differential system.

4. The materials separator of claim 1, wherein the first deck advances the first continuous filter belt toward the first end from the first roller to the second roller at the first deck top surface, and the first deck returns the first continuous filter belt toward the first end from the second roller to the first roller at the first deck bottom surface.

5. The materials separator of claim 1, wherein the first deck top surface and the first deck bottom surface are horizontal.

6. The materials separator of claim 1, wherein the first deck top surface and the first deck bottom surface are parallel.

7. The materials separator of claim 1, wherein the flowback pan extends from the first end of the materials separator to the second end of the materials separator.

8. The materials separator of claim 1, wherein the first fluid path passes through the first continuous filter belt a first time at the first deck top surface, from the first deck top surface into an interior space between the first deck top surface and the first deck bottom surface, and from the interior space through the first continuous filter belt a second time at the first deck bottom surface to the flowback pan.

9. The materials separator of claim 1, wherein the second continuous filter belt extends between the third roller and the fourth roller to define a second deck top surface extending between the third roller and the fourth roller and a second deck bottom surface extending between the third roller and the fourth roller, wherein the second deck bottom surface is opposite the second deck top surface.

10. The materials separator of claim 9, wherein the second fluid path of the fluid flows from the flowback pan, downward through the second continuous filter belt at the second deck top surface to separate the second solids from the fluid, and downward from the second deck top surface through the second continuous filter belt at the second deck bottom surface.

11. The materials separator of claim 1, wherein the first continuous filter belt has a first screen size for filtering the first solids from the fluid, and the second continuous filter belt has a second screen size for filtering the second solids from the fluid, the second screen size being finer than the first screen size such that the first solids filtered from the fluid at the first deck are larger than the second solids filtered from the fluid at the second deck.

12. The materials separator of claim 11, wherein the first screen size is a coarse chain drive for removing the first solids with the first continuous filter belt, and the second screen size is American Petroleum Institute (API) screen size of between 20 and 30 for removing the second solids of with the second continuous filter belt, wherein the second solids flow through the first continuous filter belt based on the first screen size.

13. The materials separator of claim 10, further comprising a third deck disposed below a portion of the second deck, the third deck comprising a third continuous filter belt disposed around a third set of rollers, the drive device configured to rotate at least one roller of the third set of rollers.

14. The materials separator of claim 13, further comprising a second flowback pan positioned between the second deck and the third deck.

15. The materials separator of claim 14, wherein the first continuous filter belt is a coarse chain drive, the second continuous filter belt has an API screen size of between 20 and 30, and the third continuous filter belt has an API screen size of 100 or greater.

16. The materials separator of claim 14, the third set of rollers of the third deck including a fifth roller positioned at the first end of the materials separator and a sixth roller positioned at the second end of the materials separator, the third continuous filter belt extending between the fifth roller and the sixth roller for filtering third solids from the fluid, wherein the third deck includes a third solids outlet at the second end of the materials separator for expelling the third solids separated from the fluid off of the third continuous filter belt and over the sixth roller at the second end of the materials separator.

\* \* \* \* \*